(12) United States Patent
Levy

(10) Patent No.: US 11,776,527 B2
(45) Date of Patent: Oct. 3, 2023

(54) VOICE-BASED IDENTIFICATION AND RECOMMENDATION OF RELATED PRODUCTS BASED ON PURCHASE TREND

(71) Applicant: DIGIPRINT IP LLC, Longboat Key, CA (US)

(72) Inventor: Avery Levy, Longboat Key, FL (US)

(73) Assignee: DIGIPRINT IP LLC, Longboat Key, FL (US)

( * ) Notice: Subject to any disclaimer, the term of this patent is extended or adjusted under 35 U.S.C. 154(b) by 215 days.

(21) Appl. No.: 17/018,950

(22) Filed: Sep. 11, 2020

(65) Prior Publication Data

US 2021/0166676 A1 Jun. 3, 2021

Related U.S. Application Data

(63) Continuation of application No. 15/666,949, filed on Aug. 2, 2017, now Pat. No. 10,777,185.

(51) Int. Cl.
*G10L 15/26* (2006.01)
*H04M 3/493* (2006.01)
(Continued)

(52) U.S. Cl.
CPC .......... *G10L 13/00* (2013.01); *G06Q 30/0239* (2013.01); *G06Q 30/0631* (2013.01);
(Continued)

(58) Field of Classification Search
CPC ............ G06Q 20/322; G06Q 30/0185; G06Q 10/087; G06Q 30/02; G10L 15/26; H04M 3/4938; B65G 1/127; H04R 27/00
(Continued)

(56) References Cited

U.S. PATENT DOCUMENTS 6,249,227 B1   6/2001  Brady et al.
10,777,185 B2  9/2020  Levy
(Continued)

FOREIGN PATENT DOCUMENTS

WO    WO 2019/028175    2/2019

OTHER PUBLICATIONS

PCT Application No. PCT/US2018/044870 International Preliminary Report on Patentability dated Feb. 4, 2020.
(Continued)

*Primary Examiner* — Farzad Kazeminezhad
(74) *Attorney, Agent, or Firm* — Polsinelli LLP

(57) ABSTRACT

Methods and systems for voice-based identification of related products/services are provided. Exemplary systems may include a wireless communication-based tag reader that polls for a wireless transmission-based tag and reads information associated with the wireless transmission-based tag and a processor that executes instructions to identify a product/service associated with the wireless transmission-based tag, identify a plurality of products/services stored in a product/service database identified as related to the product/service associated with the wireless transmission-based tag based on a trend related to prior purchases to identify a related product/service, and generate a voice-based utterance based on the identified set of one or more related products/services. Such systems may further include a speaker that plays the generated voice-based utterance resulting in presentation of an offer regarding the identified set of one or more related products/services and a microphone that is activated to capture any voice-based response after the generated voice-based utterance is played.

20 Claims, 5 Drawing Sheets

(51) Int. Cl.
*B65G 1/127* (2006.01)
*H04R 27/00* (2006.01)
*G06Q 30/02* (2023.01)
*G10L 13/00* (2006.01)
*G06Q 30/0601* (2023.01)
*G06Q 30/0207* (2023.01)
*H04W 4/80* (2018.01)

(52) U.S. Cl.
CPC ......... *G06Q 30/0641* (2013.01); *G06Q 30/02* (2013.01); *H04W 4/80* (2018.02)

(58) Field of Classification Search
USPC ................. 705/26.8, 26; 235/385, 376, 383; 381/77; 704/235
See application file for complete search history.

(56) References Cited

U.S. PATENT DOCUMENTS

| | | |
|---|---|---|
| 2002/0080031 A1 | 6/2002 | Mann et al. |
| 2004/0103034 A1 | 5/2004 | Reade et al. |
| 2005/0165648 A1* | 7/2005 | Razumov ............ H04M 3/4938 705/26.81 |
| 2006/0113374 A1 | 6/2006 | Taylor et al. |
| 2006/0163349 A1 | 7/2006 | Neugebauer |
| 2007/0008068 A1 | 1/2007 | Brice et al. |
| 2007/0066358 A1 | 3/2007 | Silverbrook et al. |
| 2009/0060218 A1 | 3/2009 | Sherman |
| 2010/0187306 A1 | 7/2010 | Solomon |
| 2012/0232897 A1* | 9/2012 | Pettyjohn ................ G10L 15/22 704/235 |
| 2013/0080289 A1* | 3/2013 | Roy ..................... G06Q 20/322 705/26.8 |
| 2017/0017967 A1 | 1/2017 | Ming |
| 2019/0043473 A1 | 2/2019 | Levy |

OTHER PUBLICATIONS

PCT Application No. PCT/US2018/044870 International Search Report and Written Opinion dated Oct. 24, 2018.
U.S. Appl. No. 15/666,949 Final Office Action dated Sep. 20, 2019.
U.S. Appl. No. 15/666,949 Office Action dated Feb. 21, 2019.

* cited by examiner

VOICE-BASED IDENTIFICATION AND RECOMMENDATION OF RELATED PRODUCTS BASED ON PURCHASE TREND

CROSS-REFERENCE TO RELATED APPLICATIONS

The present application is a continuation and claims the priority benefit of U.S. patent application Ser. No. 15/666,949 filed Aug. 2, 2017, now U.S. Pat. No. 10,777,185, the disclosure of which is incorporated herein by reference.

BACKGROUND OF THE INVENTION

1. Field of the Invention

The present invention generally relates to voice-based services. More specifically, the present invention relates to voice-based identification of related products/services/services.

2. Description of the Related Art

There are presently a variety of voice-based services available to certain devices. Certain mobile devices, for example, have native applications that allow for voice commands to be received, interpreted, and executed. Recent models of the Apple iPhone device, for example, come with the SIRI application that extends voice activation to a variety of services (e.g., setting timers, dictating text messages). Similarly, the Amazon Echo device uses the Alexa service to identify, interpret, and response to user voice commands. The ability to interact with user voice commands allow for hands-free interaction, thereby allowing users to request various tasks without having to type long queries that may be prone to being misunderstood in the event of misspelling.

One disadvantage to voice-based systems, however, that it takes longer to convey information vocally between user and system vis-à-vis systems that rely on visual displays. As such, the presently known voice-based services and applications generally rely on predefined sets of commands directed at defined tasks. Certain voice commands may not be recognizable to such voice-based systems, and responses to recognized voice commands may be limited to a pre-defined response associated with the identified tasks. Whereas a query entered into a browser window on a computing device may elicit numerous results from a variety of different sources, the same query elicits only a brief and limited response from a voice-based service. One such context is shopping, where numerous outlets and products/services/services may be presented online in response to a shopping query, but a similar query posed to a voice-based service may elicit a response that is limited to a preset user account and predefined product/service.

There is, therefore, a need in the art for improved systems and methods for voice-based identification of related products/services/services.

SUMMARY OF THE CLAIMED INVENTION

Embodiments of the present invention allow methods and systems for voice-based identification of related products/services. Exemplary systems may include a wireless transmission-based tag reader that polls for a wireless transmission-based tag and reads information associated with the wireless transmission-based tag and a processor that executes instructions to identify a product/service associated with the wireless transmission-based tag, identify a plurality of products/services stored in a product/service database identified as related to the product/service associated with the wireless transmission-based tag, filter through the plurality of related products/services based on at least one voice-based parameter to identify a set of one or more related products/services, and generate a voice-based utterance based on the identified set of one or more related products/services. Such systems may further include a speaker that plays the generated voice-based utterance resulting in presentation of an offer regarding the identified set of one or more related products/services and a microphone that is activated to capture any voice-based response after the generated voice-based utterance is played.

DETAILED DESCRIPTION

Embodiments of the present invention allow methods and systems for voice-based identification of related products/services. Exemplary systems may include a wireless transmission-based tag reader that polls for a wireless transmission-based tag and reads information associated with the wireless transmission-based tag and a processor that executes instructions to identify a product/service associated with the wireless transmission-based tag, identify a plurality of products/services stored in a product/service database identified as related to the product/service associated with the wireless transmission-based tag, filter through the plurality of related products/services based on at least one voice-based parameter to identify a set of one or more related products/services, and generate a voice-based utterance based on the identified set of one or more related products/services. Such systems may further include a speaker that plays the generated voice-based utterance resulting in presentation of an offer regarding the identified set of one or more related products/services and a microphone that is activated to capture any voice-based response after the generated voice-based utterance is played. Wireless transmission technologies associated with the present disclosure may include any type of wireless transmission capability known in the art, including, yet not limited to radio frequency identifiers (RFID), Bluetooth™, near field communications (NFC), iBeacon, CCD, MEMS or other wireless transmission techniques.

Figure 1:
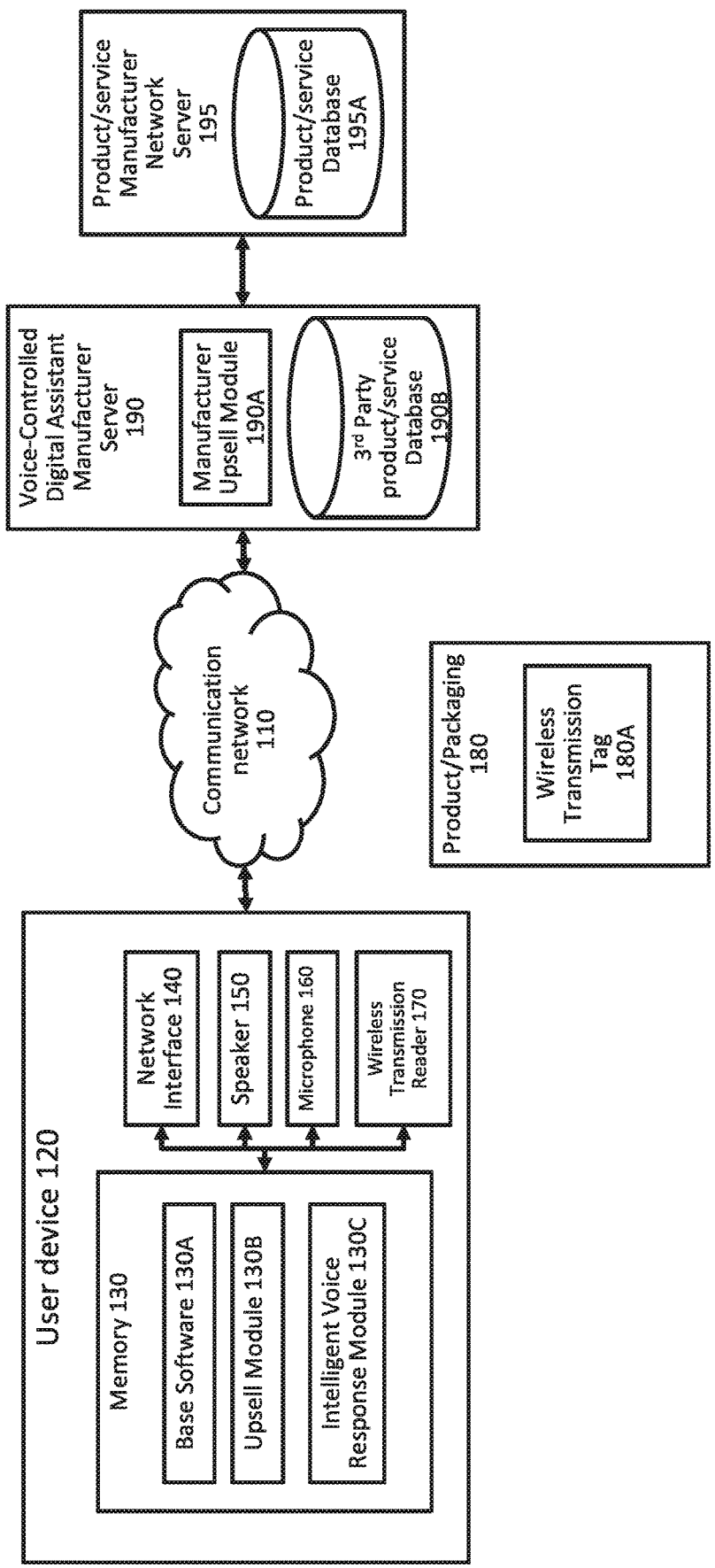
FIG. 1 illustrates a network environment in which a system for voice-based identification of related products/services may be implemented.

FIG. 1 illustrates a network environment in which a system for voice-based identification of related products/services may be implemented. Such a network environment may include a voice-based device 120 and various servers 190/195 and databases 190A-B/195. Such servers 190/195 and databases 190A-B/195 may be specific to a particular voice-based service, product manufacturer, service provider, retailer, wholesaler, mail order catalogue, electronic commerce website, or other third party servers and databases.

Communication network 110 may be a local, proprietary network (e.g., an intranet) and/or may be a part of a larger wide-area network. The communications network may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network allows for communication between the various components of network environment.

Figure 5:
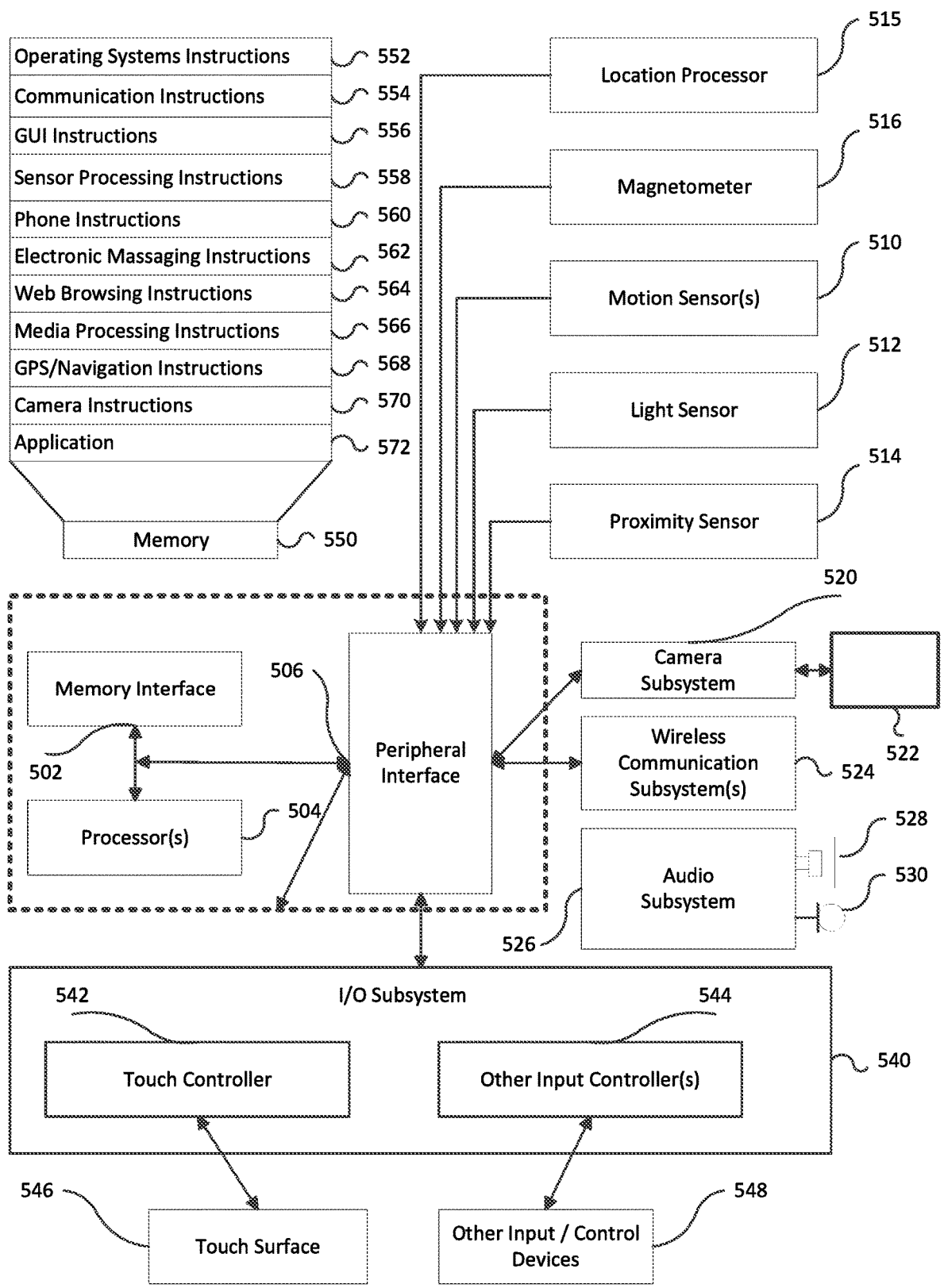
FIG. 5 illustrates a mobile device architecture that may be utilized to implement the various features and processes described herein.

Users may use any number of different electronic user devices 120 that may be integrated with voice-based services or applications, including general purpose computers, mobile phones, smartphones, personal digital assistants (PDAs), portable computing devices (e.g., laptop, netbook, tablets), desktop computing devices, handheld computing device, intelligent home device, smart speaker, or any other type of computing device capable of communicating over communication network 110 such as that described in further detail with respect to FIG. 5. Such user devices 120 may also be configured to access data from other storage media, including local and remote devices as may be appropriate in the case of downloaded services. User device 120 may include standard hardware computing components such as network interfaces 140 for communication over a communication network 110, media interfaces such as speakers 150 and microphones 160 for playing and capturing at least audio media, non-transitory computer-readable storage (memory 130), and processors for executing instructions that may be stored in memory 130 (e.g., base software 130A, upsell module 130B, and intelligent voice response module 130C).

Integration with voice-based services may include standard or custom intelligent voice response software modules 130C executable to interpret voice-based utterances received through the microphone 160, as well as generate voice-based utterances to be played through the speaker 150. In some embodiments, execution of the intelligent voice response software module 130C results capture of vocal utterances and communication of the same through the network connection with a remote server 190/195 or database 190A-B/195A specific to the voice-based system of user device 120. Such communication may allow for remote resources (e.g., additional information and processing) to be applied to a query.

In embodiments of the present invention, such user devices 120 may further be associated with a wireless transmission-based tag reader 170 capable of polling for wireless transmission-based tags 180A within a range of the wireless transmission reader 170. Upon identifying such a wireless transmission-based tag 180A, the wireless transmission reader may further read information communicated by such wireless transmission-based tag 180A.

Servers 190/195 and databases 190A-B/195 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

In an exemplary embodiment, a product/service 180 may be associated with a wireless transmission-based tag 180A that identifies the particular product 180 (e.g., brand, type, model). Such a wireless transmission-based tag 180A may be embedded or otherwise associated with the product/service 180, product packaging 180, manual, or other related materials. The wireless transmission-based tag 180A may communicate a set of information related to the product/service 180, including identifying information and one or more uniform resource locators (URLs) associated with the product/service 180. Each such URL may link to one of the related servers 190/195 and databases 190A-B/195 (e.g., Amazon Alexa, Google Home) that may be used to implement voice-based identification of related products/services.

The wireless transmission-based tag 180A information read by the wireless transmission reader 170 may trigger execution of one or more software modules (e.g., upsell module). Execution of such software modules may result in identification of the particular product 180 associated with the wireless transmission-based tag 180A and further, identification of other products/services related to the tagged product 180. The identification of related products/services may rely in part on information stored at and retrieved from remote servers 190/195 and databases 190A-B/195. A product manufacturer network server 190 (e.g., associated with a retailer such as LL Bean, Nike, etc.) allow access to a database of product and/or services. Such databases 190A-B/195 may provide a list of product and/or services related to the tagged product 180. Such relationship may be identified directly by the particular product manufacturer (e.g., accessories commonly purchased with the tagged product 180), or may be identified from purchase histories and trends related to the tagged product 180.

The user device 120 may receive one or more such lists from the remote servers 190/195 and databases 190A-B/195, each identifying related products/services. The tagged product 180 may therefore be identified as being related to a number of such related products/services. Additional filtering may be done based on a variety of parameters where, for example, the set of related products/services is extremely large, redundant, or otherwise includes products/services that are less commonly purchased with the tagged product 180. Such parameters may be specific to the voice-based system or a user or account associated with the user device 120, and may therefore reflect limitations or predetermined preferences associated with the same.

The user device 120 may then execute one or more voice-based software modules to generate a voice-based utterance that would present a vocal offer regarding the filtered set of related product when played through the speaker 150. Such offers may further rely on and incorporate information provided from the remote servers 190/195 and databases 190A-B/195 regarding the related goods, including information regarding popularity, how the related product is used with the tagged product 180, price, applicable sales/discounts, etc. The microphone 160 of the user device 120 may be activated so as to be able to poll for sound-based responses. Such responses may identify or select one or more of the presented products/services, and such identification may be forwarded to the appropriate purchasing systems for processing. Such purchasing systems may be associated with or hosted by one or more of the remote servers 190/195 discussed above. Further, the information regarding selected products/services may be tracked and used to identify preferences and trends that may be used as parameters to filter subsequent queries presented to the user device 120.

For example, a user who scans a wireless transmission-based tag 180A associated with LL Bean model XYZ boots may be presented with an offer: "thank you for purchasing your LL Bean model XYZ boots, would you like to order the weatherproofing cream to help preserve them?" If the customer responds that they do want to order the weatherproofing cream, that item is added to their shopping cart in an online purchasing system that is processed in accordance with those presently known in the art. Such offers may be presented with respect to a remainder of the filtered set of related products/services. In some embodiments, the method of identifying related products/services may further be applied to the related products/services to identify further products/services that are related to the related products/services.

Figure 2:
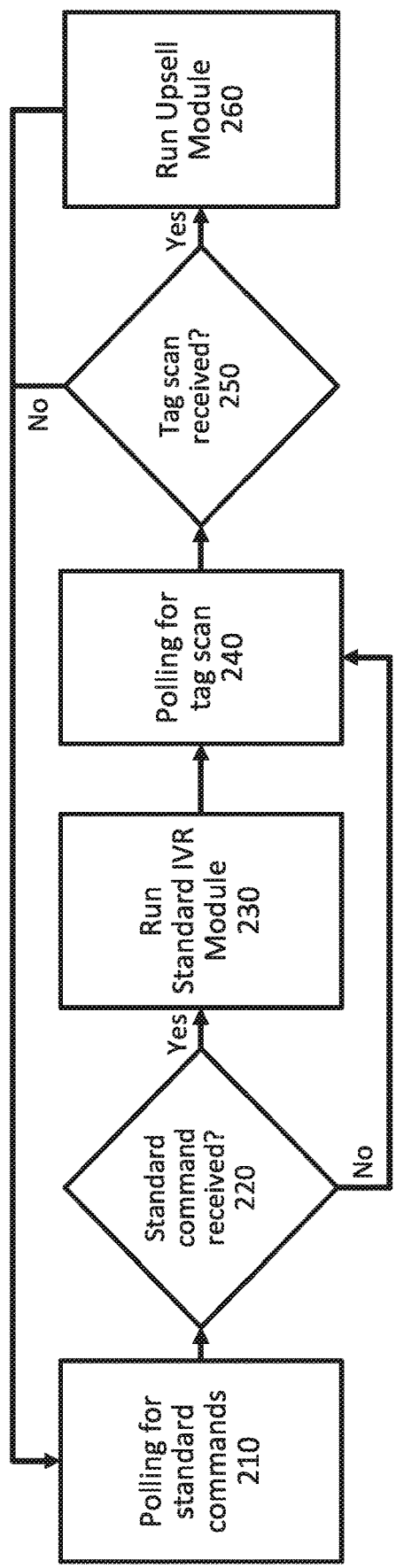
FIG. 2 illustrates an exemplary method for triggering the upsell module.

FIG. 2 illustrates an exemplary method for triggering the upsell module. Such a method may involve the base software module polling the microphone 160 for standard commands that are part of its voice-command library in step 210. When it is determined that a standard command is received in step 220, the standard IVR module may be executed in step 230. The base software may cause the wireless transmission reader 170 to poll for a wireless transmission-based tag 180A in step 240. When a wireless transmission-based tag 180A is determined to have been scanned in step 250, execution of the upsell module may be triggered in step 260.

Figure 3:
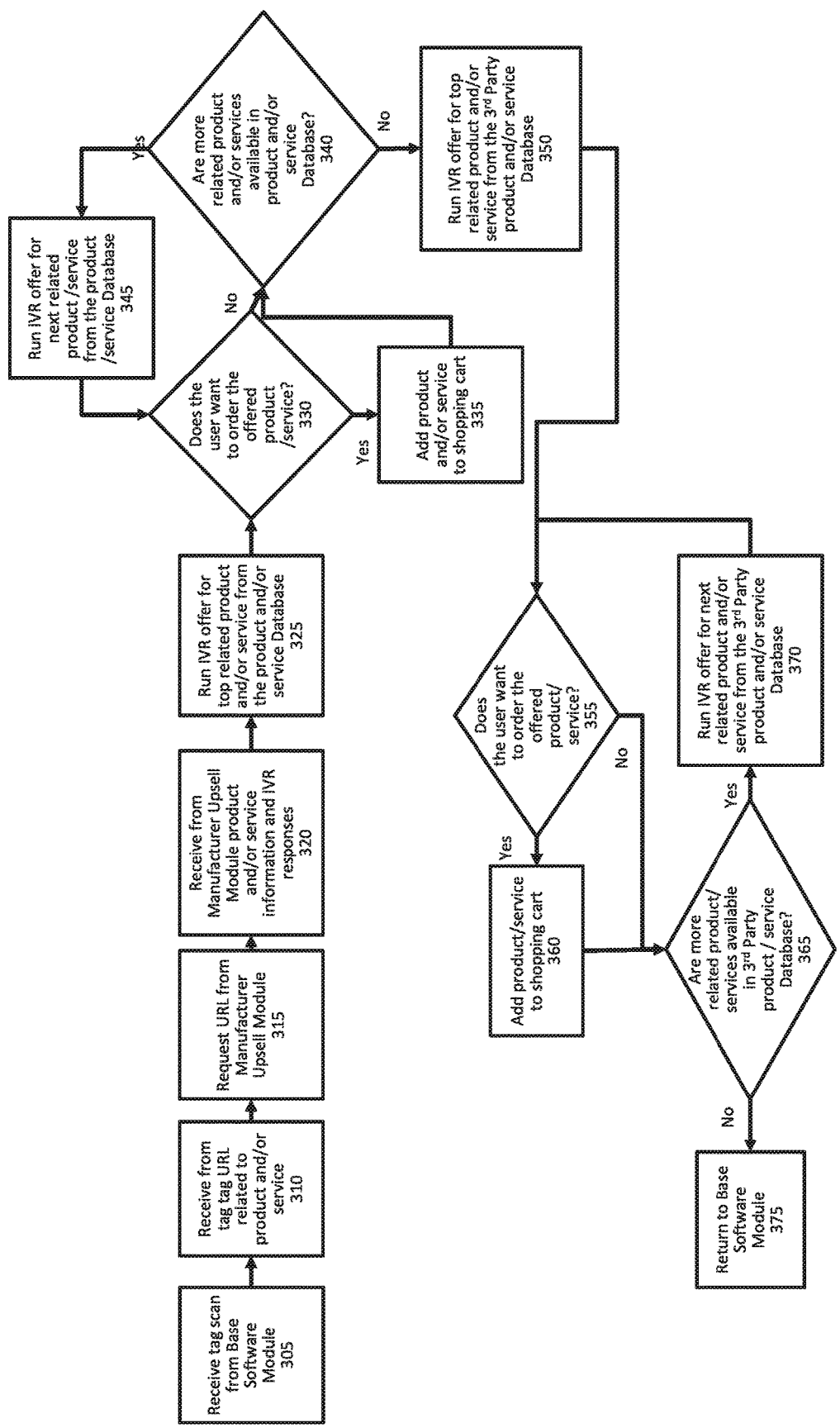
FIG. 3 illustrates an exemplary method for voice-based identification of related products/services.

FIG. 3 illustrates an exemplary method for voice-based identification of related products/services. The upsell module may be located on the device memory and executed when triggered (e.g., by the base software module) responsive to a wireless transmission-based tag 180A scan by the wireless transmission reader 170 in step 305. In step 310, he wireless transmission-based tag 180A may identify one or more URLs associated with remote web servers 190/195 and databases 190A-B/195 for a request made in 315, in response to which information is provided regarding related products/services and services (e.g., from servers 190/195 and databases 190A-B/195 maintained by product manufacturers, service providers, third party product and/or service providers, including those related to voice-based services) in step 320.

In step 325, the related products/services and services may then be offered to the customer in a voice-based utterance (e.g., "thank you for purchasing your LL Bean model XYZ boots, would you like to order the weatherproofing cream to help preserve them?"). If the customer is determined to respond affirmatively in step 330, that item may be added to their shopping cart (which may be specific to one or more different outlets) in step 335. If there are determined to be remaining related products/services in step 340, a subsequent offer may be made with respect to such remaining related products/services yet to be presented in step 345 or products/services identified as being related to the related product now in the shopping cart in step 350. Such twice-removed related products/services may be offered in step 355, added to the shopping care in step 360 in iterative fashion for each remaining twice-removed related product in step 370.

Items added to the shopping cart may thereafter be provided to one or more associated purchasing systems to be processed in accordance with such purchasing systems that are known in the art. When all related product and/or services have been offered to the user, the method may returns to the base software module in step 375. At any point, the user may indicate that he or she is not interested in any further offers, and the method may be halted based on the same.

Figure 4:
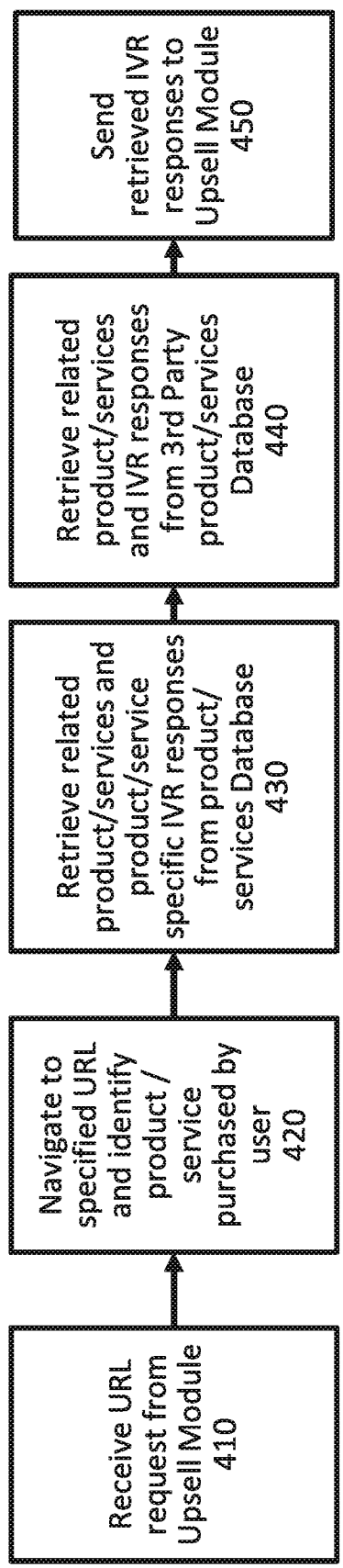
FIG. 4 illustrates an exemplary method of voice-based identification of related products/services, such as that performed by a remote server.

FIG. 4 illustrates an exemplary method of voice-based identification of related products/services, such as that performed by a remote server 190/195 associated with a manufacturer, service provider, related third party, or voice-based service provider as discussed herein. For example, such a method may be performed by a remote manufacturer server 195, which may be triggered when an associated URL from a wireless transmission-based tag 180A initiates a communication between the user device 120 and the remote server in step 410. Such communication may include a query regarding a product/service 180 associated with the wireless transmission-based tag 180A, where such query is provided to remote server 190/195 in step 420. In step 430, the remote server may search one or more databases and in step 440, generate a query response that includes a list of products/services/services related to the tagged product 180. Such a list—along with related voice-based responses—may be relayed from server 190 to the user device 120 in step 450.

FIG. 5 illustrates a mobile device architecture that may be utilized to implement the various features and processes described herein. Architecture 500 can be implemented in any number of portable devices including but not limited to smart phones, electronic tablets, and gaming devices. Architecture 500 as illustrated in FIG. 5 includes memory interface 502, processors 504, and peripheral interface 506. Memory interface 502, processors 504 and peripherals interface 506 can be separate components or can be integrated as a part of one or more integrated circuits. The various components can be coupled by one or more communication buses or signal lines.

Processors 504 as illustrated in FIG. 5 is meant to be inclusive of data processors, image processors, central processing unit, or any variety of multi-core processing devices. Any variety of sensors, external devices, and external subsystems can be coupled to peripherals interface 506 to facilitate any number of functionalities within the architecture 500 of the exemplar mobile device. For example, motion sensor 510, light sensor 512, and proximity sensor 514 can be coupled to peripherals interface 506 to facilitate orientation, lighting, and proximity functions of the mobile device. For example, light sensor 512 could be utilized to facilitate adjusting the brightness of touch surface 546. Motion sensor 510, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 506, such as a temperature sensor, a biometric sensor, or other sensing device to facilitate corresponding functionalities. Location processor 515 (e.g., a global positioning transceiver) can be coupled to peripherals interface 506 to allow for generation of geo-location data thereby facilitating geo-positioning. An electronic magnetometer 516 such as an integrated circuit chip could in turn be connected to peripherals interface 506 to provide data related to the direction of true magnetic North whereby the mobile device could enjoy compass or directional functionality. Camera subsystem 520 and an optical sensor 522 such as a charged coupled device (CCD) or a complementary metal-oxide semiconductor (CMOS) optical sensor can facilitate camera functions such as recording photographs and video clips.

Communication functionality can be facilitated through one or more communication subsystems 524, which may include one or more wireless communication subsystems. Wireless communication subsystems 524 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 524 may depend on the communication network 110 or medium over which the device is intended to operate. For example, a device may include wireless communication subsystem designed to operate over a global system for mobile communications (GSM) network, a GPRS network, an enhanced data GSM environment (EDGE) network, 802.x communication network 110s, code division multiple access (CDMA) networks, or Bluetooth networks. Communication subsystem 524 may include hosting protocols such that the device may be configured as a base station for other wireless devices. Communication subsystems can also allow the device to synchronize with a host device using one or more protocols such as TCP/IP, HTTP, or UDP.

Audio subsystem 526 can be coupled to a speaker 528 and one or more microphones 530 to facilitate voice-enabled functions. These functions might include voice recognition, voice replication, or digital recording. Audio subsystem 526 in conjunction may also encompass traditional telephony functions.

I/O subsystem 540 may include touch controller 542 and/or other input controller(s) 544. Touch controller 542 can be coupled to a touch surface 546. Touch surface 546 and touch controller 542 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 546 may likewise be utilized. In one implementation, touch surface 546 can display virtual or soft buttons and a virtual keyboard, which can be used as an input/output device by the user.

Other input controllers 544 can be coupled to other input/control devices 548 such as one or more buttons, rocker switches, thumb-wheels, infrared ports, USB ports, and/or a pointer device such as a stylus. The one or more buttons (not shown) can include an up/down button for volume control of speaker 528 and/or microphone 530. In some implementations, device 500 can include the functionality of an audio and/or video playback or recording device and may include a pin connector for tethering to other devices.

Memory interface 502 can be coupled to memory 550. Memory 550 can include high-speed random access memory or non-volatile memory such as magnetic disk storage devices, optical storage devices, or flash memory. Memory 550 can store operating system 552, such as Darwin, RTXC, LINUX, UNIX, OS 5, ANDROID, WINDOWS, or an embedded operating system such as VxWorks. Operating system 552 may include instructions for handling basic system services and for performing hardware dependent tasks. In some implementations, operating system 552 can include a kernel.

Memory 550 may also store communication instructions 554 to facilitate communicating with other mobile computing devices or servers. Communication instructions 554 can also be used to select an operational mode or communication medium for use by the device based on a geographic location, which could be obtained by the GPS/Navigation instructions 568. Memory 550 may include graphical user interface instructions 556 to facilitate graphic user interface processing such as the generation of an interface; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes, camera instructions 570 to facilitate camera-related processes and functions; and instructions 572 for any other application that may be operating on or in conjunction with the mobile computing device. Memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network 110. Some examples of communication network 110s include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for an audio-based user interface, the method comprising:
   accessing user preference data after receiving product relationship data associated with a first voice-based utterance that identifies a first product, wherein the product relationship data identifies a relationship between the first product and a second product indicated by a trend related to prior purchases of a second product in addition to the first product;
   comparing the user preference data with the product relationship data to identify the relationship between the first product and the second product and the trend;
   providing a second voice-based utterance that offers the second product for transaction processing in addition to the first product using an audio subsystem based on the comparing of the user preference data with the product relationship data;
   receiving a voice-based command from the audio subsystem based on the audio subsystem recording a voice of a user; and
   selecting the second product for transaction processing in addition to the first product based on the receiving of the voice-based command.

2. The method of claim 1, further comprising receiving the product relationship data from a remote computer.

3. The method of claim 1, further comprising:
   receiving product data based on an interaction with an interactive element associated with the second product, wherein the product data identifies the second product; and
   identifying that the second product is related to the first product, wherein the user preference data and the product relationship data are compared to identify the second voice-based utterance based on the second product being related to the first product.

4. The method of claim 1, further comprising:
   receiving product data based on an interaction with an interactive element associated with at least one of the first product or the second product;
   accessing a computer based on the receiving of the product data; and
   receiving the product relationship data from the computer.

5. The method of claim 1, further comprising:
   evaluating historical purchase data associated with the first product; and
   identifying the second product based at least in part on the evaluating of the historical purchase data associated with the first product.

6. The method of claim 1, further comprising identifying that the second voice-based utterance identifies a service associated with the first product, wherein the second product includes the service.

7. The method of claim 1, further comprising:
   interpreting the voice-based command, wherein the selecting of the second product for transaction processing in addition to the first product is also based on the interpreting of the voice-based command.

8. The method of claim 1, wherein the audio subsystem includes a speaker that plays the voice-based utterance, and wherein the audio subsystem includes a microphone that records the voice of the user.

9. The method of claim 1, wherein the prior purchases of the second product in addition to the first product include at least one prior purchase by a second user.

10. The method of claim 1, wherein the selecting of the second product for transaction processing in addition to the first product includes selecting of the second product for purchasing in addition to the first product.

11. A non-transitory computer-readable storage medium having embodied thereon a program executable by a processor for performing a method for an audio-based user interface, the method comprising:
   accessing user preference data after receiving product relationship data associated with a first voice-based utterance that identifies a first product, wherein the product relationship data identifies a relationship between the first product and a second product indicated by a trend related to prior purchases of a second product in addition to the first product;
   comparing the user preference data with the product relationship data to identify the relationship between the first product and the second product and the trend;
   providing a second voice-based utterance that offers the second product for transaction processing in addition to the first product using an audio subsystem based on the comparing of the user preference data with the product relationship data;
   receiving a voice-based command from the audio subsystem based on the audio subsystem recording a voice of a user; and selecting the second product for transaction processing in addition to the first product based on the receiving of the voice-based command.

12. The non-transitory computer-readable storage medium of claim 11, the method associated with the program further comprising receiving the product relationship data from a remote computer.

13. The non-transitory computer-readable storage medium of claim 11, the method associated with the program further comprising:
receiving product data based on an interaction with an interactive element associated with the second product, wherein the product data identifies the second product; and
identifying that the second product is related to the first product, wherein the user preference data and the product relationship data are compared to identify the second voice-based utterance based on the second product being related to the first product.

14. The non-transitory computer-readable storage medium of claim 11, the method associated with the program further comprising:
receiving product data based on an interaction with an interactive element associated with at least one of the first product or the second product;
accessing a computer based on the receiving of the product data; and
receiving the product relationship data from the computer.

15. The non-transitory computer-readable storage medium of claim 11, the method associated with the program further comprising identifying that the second voice-based utterance identifies a service associated with the first product, wherein the second product includes the service.

16. An apparatus for an audio-based user interface, the apparatus comprising:
a memory; and
a processor that executes instructions out of the memory to:
access user preference data after receiving product relationship data associated with a first voice-based utterance that identifies a first product, wherein the product relationship data identifies a relationship between the first product and a second product indicated by a trend related to prior purchases of a second product in addition to the first product;
compare the user preference data with the product relationship data to identify the relationship between the first product and the second product and the trend;
provide a second voice-based utterance that offers the second product for transaction processing in addition to the first product using an audio subsystem based on the comparing of the user preference data with the product relationship data;
receive a voice-based command from the audio subsystem based on the audio subsystem recording a voice of a user; and
select the second product for transaction processing in addition to the first product based on the receiving of the voice-based command.

17. The apparatus of claim 16, wherein the product relationship data is received from a remote computer via a computer network.

18. The apparatus of claim 16, wherein the processor also executes the instructions to:
receive product data based on an interaction with an interactive element associated with the second product, wherein the product data identifies the second product, and
identify that the second product is related to the first product, wherein the user preference data and the product relationship data are compared to identify the voice-based utterance based on the second product being related to the first product.

19. The apparatus of claim 16, further comprising an electronic interface that receives data based on an interaction with an interactive element associated with at least one of the first product or the second product, wherein the processor also executes the instructions to:
access a computer based on the receiving of the product data, and
receive the product relationship data from the computer.

20. The apparatus of claim 16, wherein the processor also executes the instructions to:
evaluate historical purchase data associated with the first product; and
identify the second product based at least in part on the evaluating of the historical purchase data associated with the first product.

* * * * *